US007900676B2

(12) United States Patent
Lipsky

(10) Patent No.: US 7,900,676 B2

(45) Date of Patent: Mar. 8, 2011

(54) APPARATUS TO FACILITATE PROPER LABEL PLACEMENT AND METHOD OF USE

(76) Inventor: Daniel Lipsky, Simi Valley, CA (US)

( * ) Notice: Subject to any disclaimer, the term of this patent is extended or adjusted under 35 U.S.C. 154(b) by 165 days.

(21) Appl. No.: 12/165,791

(22) Filed: Jul. 1, 2008

(65) Prior Publication Data

US 2009/0205771 A1 Aug. 20, 2009

Related U.S. Application Data

(60) Provisional application No. 61/029,306, filed on Feb. 15, 2008.

(51) Int. Cl.

*B65C 9/26* (2006.01)
*B29C 65/00* (2006.01)
*B31F 5/00* (2006.01)
*B32B 37/00* (2006.01)
*B65H 29/00* (2006.01)
*G05G 15/00* (2006.01)
*B29C 65/78* (2006.01)

(52) U.S. Cl. ......... 156/391; 156/556; 156/579; 156/349; 156/538; 156/539; 156/423; 156/552

(58) Field of Classification Search .................. 156/391, 156/556, 579, 349, 538, 539, 423, 552
See application file for complete search history.

(56) References Cited

U.S. PATENT DOCUMENTS 3,953,932 A * 5/1976 Graves ........................... 40/27.5
4,429,677 A 2/1984 Moore
4,827,640 A 5/1989 Jones
5,427,233 A 6/1995 Zinck et al.
5,715,934 A 2/1998 Tobol et al.
5,875,576 A 3/1999 Kram et al.
6,240,991 B1 6/2001 Claussnitzer
6,347,654 B1 * 2/2002 Koch ........................... 156/391
6,352,261 B1 3/2002 Brown
6,435,243 B2 * 8/2002 Koch ............................ 156/391
6,481,484 B1 * 11/2002 Isshiki .......................... 156/556
6,508,466 B1 * 1/2003 Rendleman ............... 273/148 R
6,534,142 B1 3/2003 Hummell et al.
6,635,143 B2 10/2003 Zurawski et al.
6,805,180 B2 10/2004 Flynn et al.
D513,771 S 1/2006 Su et al.
D515,147 S 2/2006 Su et al.
7,001,476 B2 2/2006 Flynn et al.
7,182,901 B2 2/2007 Tseng et al.
7,302,982 B2 12/2007 Wien et al.

* cited by examiner

*Primary Examiner* — Khanh Nguyen
*Assistant Examiner* — Matthew Hoover
(74) *Attorney, Agent, or Firm* — Law Office of Ken Dallara; Ken Dallara

(57) ABSTRACT

A device that enables a user to properly place a label onto the center of an object such as a poker chip is disclosed and the method for using the device is also disclosed. This device uses the natural motions of the human hand and uses techniques that are common to people when applying adhesive labels onto objects. People naturally place one side of a label down carefully checking its alignment. When there is at least one square corner, a label is more easily aligned, but a circular label on a circular object is difficult at best. Consumers are interested in poker chips as form of entertainment as well wanting to customize these chips as an extension of their personality or persona. This device allows for the immediate and successful placement of many labels onto these chips.

8 Claims, 5 Drawing Sheets

SECTION A-A

SECTION B-B

SECTION D-D

APPARATUS TO FACILITATE PROPER LABEL PLACEMENT AND METHOD OF USE

PRIOR APPLICATION HISTORY

This application is a based on a provisional application 61/029,306, filed Feb. 15, 2008, and is herewith fully incorporated in it's entirety herein.

FIELD OF INVENTION

The application of graphic labels onto a round object where centering is critical occurs in many fields of application. The best mode of practicing this invention involves the placement of graphically enhanced labels onto poker chips, but this is not intended to limit the field of application. There are many games where round objects are used as game pieces and customizing these objects as token, party favors or business cards is desirable. Round objects such as game pieces for backgammon, bingo, and various board games, condom carrying game tokens and even tiddlywinks are labeled with promotional, informational or instructional labels.

BACKGROUND OF INVENTION

With the advent of the increased interest in the game of poker, each establishment is making efforts to customize their playing environment and also is trying to create recognizable tokens developing brand identities and eliminating cross-over play. Currently, poker chips are usually ink-stamped using offset or pad printing techniques creating a permanent ink onto the face of the poker chip. This creates a lasting impression which is not modifiable. It is also an inexpensive process to create the plates and artwork for each different impression type. Multiple printing plates are required for different colors and pictures appear grainy.

The game of poker has also become a game played at homes and parties and people are interested in designing their own chip designs but are not able to afford the expensive pad printing option. People are using poker chips at social events and as invitation greeting, adding intrigue to a party invitations. Customizing these chip would add to their value, usefulness and will lead to increased sales.

With the advent of better printer technologies and label stock that is suited for the new printers, people are able to create graphic labels containing pictures that are clearer and brighter than previously available. It is the application of these labels onto the poker chip where the problem lies. If the graphic is not perfectly centered on the first application, the label is hard to remove and will cause damage to the poker chip and the label itself. This is also a laborious process taking much time and effort. There is a need to be able to quickly apply labels to objects such as poker chips where the concentricity of the label to the outside diameter object is critical. This device and method can be used for round or polygonal objects depending upon the shape of the receiving portion of the device.

There are currently no devices on the market that allows for perfect placement, as this device takes advantage of human factors and aids users by using naturally based motions commonly used, so the learning curve is minimal. There is prior art based on labeling compact disks and DVD disks but all such applications use the hole in the center of the disk for centering and a custom label with the similarly shaped and located hole in order to locate the label over the disk. Fixtures are large and bulky and are generally not considered hand held. Presently existing prior art is also not focused on the need to perform the application of labels to both sides of a circular object without having first to re-orient that object prior to the application of the label. This invention allows for a single placement of the object into the device where labels can be applied to alternate sides without removing the object from the device.

DETAILED DESCRIPTION OF THE INVENTION AND METHOD

Figure 1:
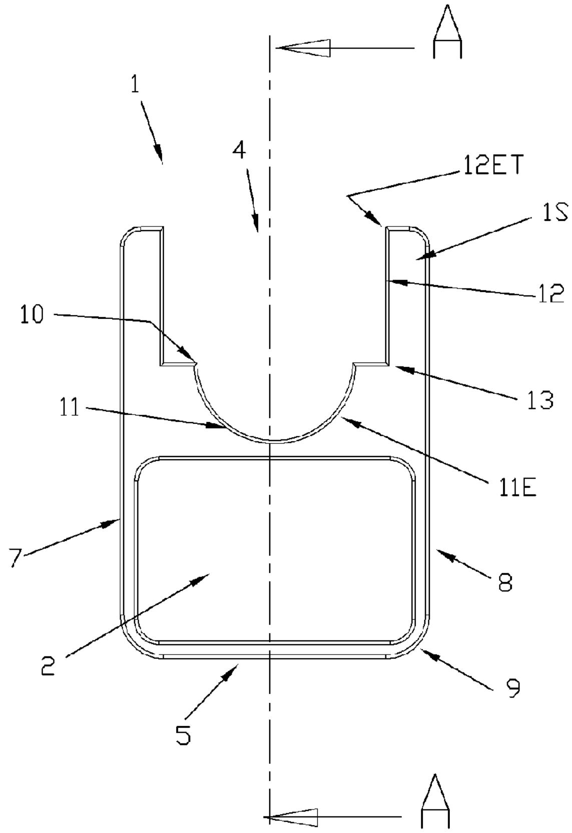
FIG. 1 contains a cross-sectional side view of the device sectioned through the vertical axis.
Figure 1:
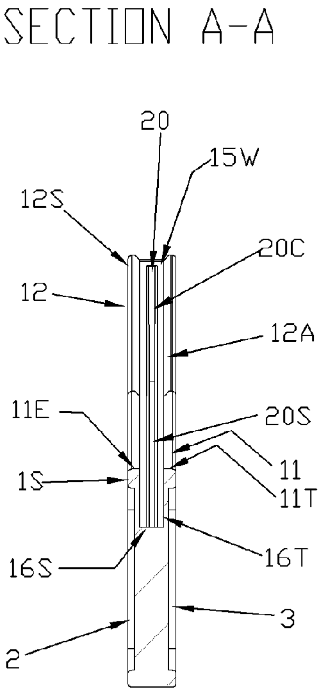
Figure 2:
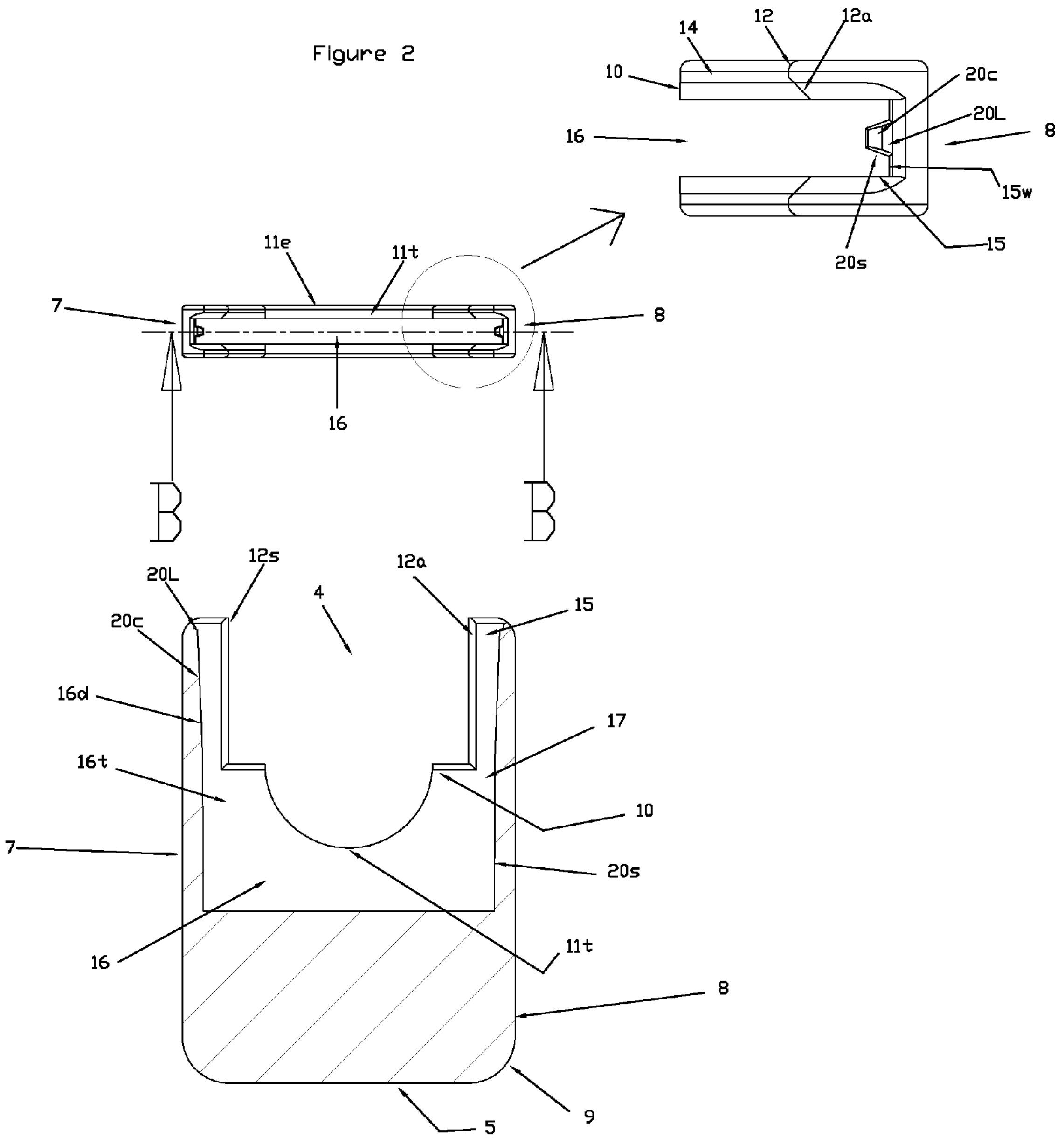
FIG. 2 contains a cross-sectional face view of the device sectioned through the vertical axis along with an exploded view of the lead-in section of the view.
Figure 3:
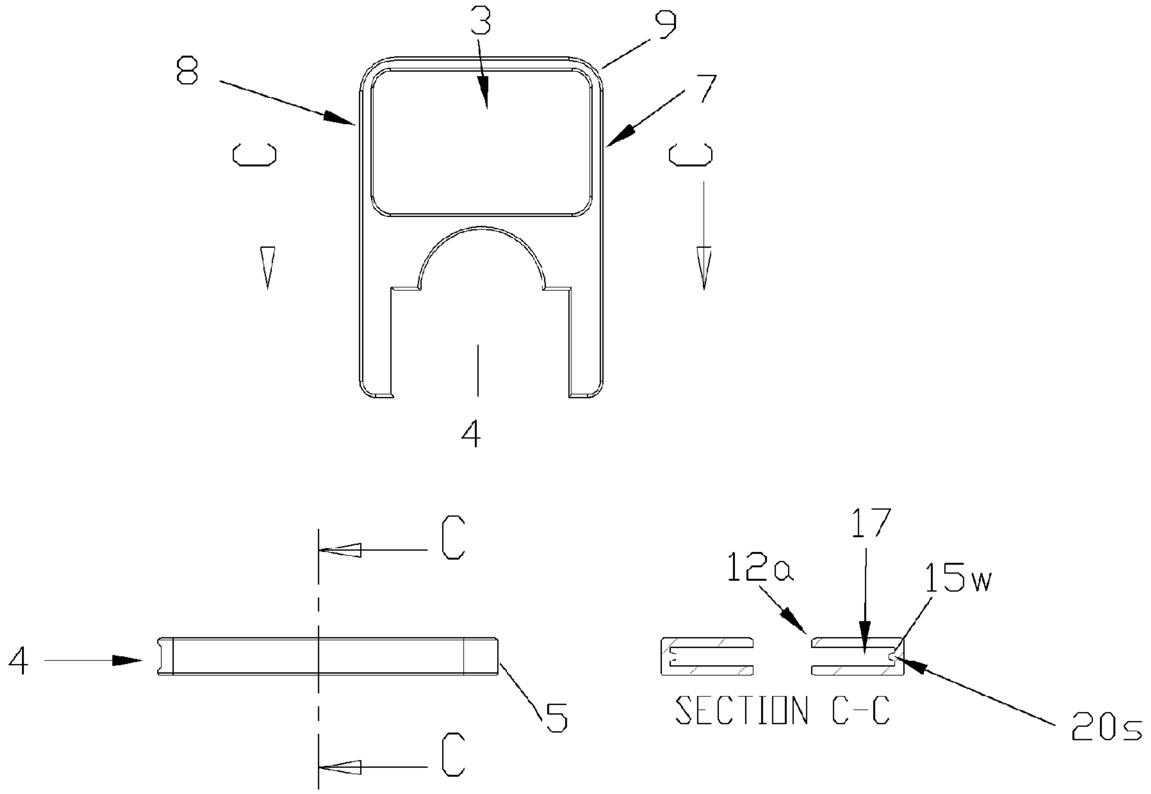
FIG. 3 contains a cross-sectional face view of the device sectioned along a horizontal access viewing from the approximate center of the object towards the upper outside edge.
Figure 4:
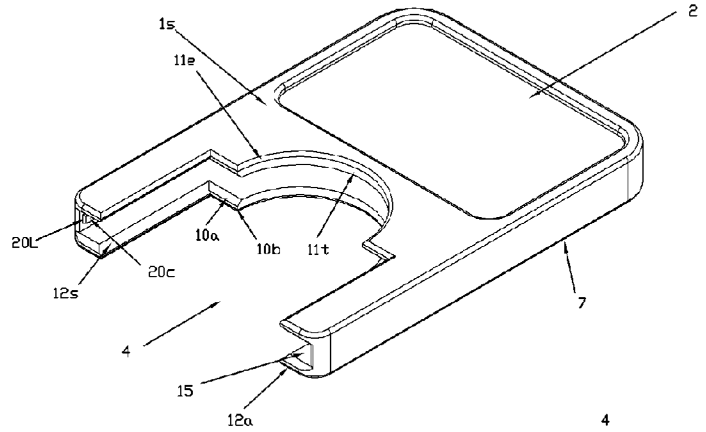
FIG. 4 is an isometric view of the exterior of the device from a right side frontal viewpoint.

In FIG. 1, device 1 is shown in its frontal projection with a vertical cross sectional view through along the vertical center of axis. Device 1 is defined by vertical sides 7 and 8 equidistant from the vertical center of axis and a bottom section 5, which has rounded corners 9 providing the attachment between sides 7 and 8 to bottom 5. Opening 4 is located at the termination of sides 7 and 8 located opposite of bottom 5. Opening 4 is defined proximally by slides 12 one of each said slide being equidistant on each side of the vertical axis and distally by the label centering opening 11. Slide 12 has an exterior termination point 12*et* along opening 4 and an interior termination end 13. Slide 12 has a rounded peripheral leading edge 12*s* which is perpendicular to surface 1*s* of device 1. Leading edge 12*s* transitions into angled slide portion 12*a* whose angle is defined as one that is necessary to allow for a lead-in or guiding angle which a poker chip is inserted therein. FIG. 2 contains a enlarged sectional view of the lead-in portion.

Edge 12*s* defines the exterior edges of slide opening 15. Opening 15 is a three sided area defined by the area emanating from the termination of edge 12*s* to cavity wall 15*w*, wall 15*w* being parallel in nature to vertical sides 7 and 8. Opening wall 15*w* has centrally located thereupon rail 20. Chip cavity 17 is defined as the interior cavity best viewed in FIG. 2 as that area between wall 15*w* and chip stop 16 mirrored about the vertical axis of device 1. The length of wall 15*w* between exterior termination point 12*et* and stop 16 will approximate the diameter of the object to the inserted. Interior termination end 13 is located at a distance equivalent to approximately ½ of the diameter of the object to be inserted. Label centering opening 11 is defined by the size of the label that will be attached to the object to be inserted into the device. It is critical to the successful location of the label onto the object, that the size of the opening closely match the size of the label allowing for manufacturing tolerance of the label and material used to create the device.

Label centering opening 11 is located about the vertical center axis of device 1 being shaped to accommodate the label shape being applied split about the horizontal axis of the label. In the application at hand, the label is circular in nature. Opening start point 10 is interiorally located from termination end 13 closer to the vertical axis. The maximum depth, the greatest distance from opening 4 to opening termination point 11*t*, matches the start point of the application of the label onto the object. Termination point 11*t* and the remaining edges of label centering opening 11 form the stop upon which the label rests during application. The distance between the opposing start points 10 is approximately ½ of the diameter of the label to be applied, equidistant from the vertical center of axis. The edge that defines label centering opening 11 that extends from surface 1*s* is a vertical inclined edge 11*e* which has an reverse rake angle of no more than 10 degrees. Currently supplied drawings demonstrate a mere draft angle.

In this application, a poker chip 30 is being used to demonstrate the best mode of practicing this invention. Chip 30 is defined by a perimeter edge 31 encircling the entire chip with a centered inset submerged below the surface of the chip.

Figure 6:
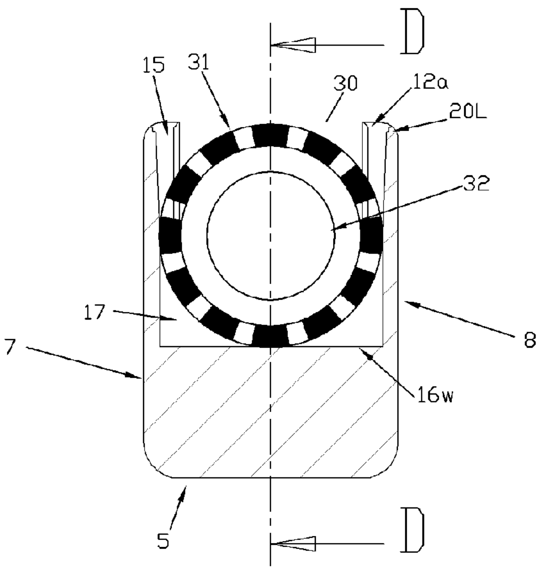
FIG. 6 is a cross-sectional view of the device where a poker chip has been inserted into the proper positioning for label application.
Figure 6:
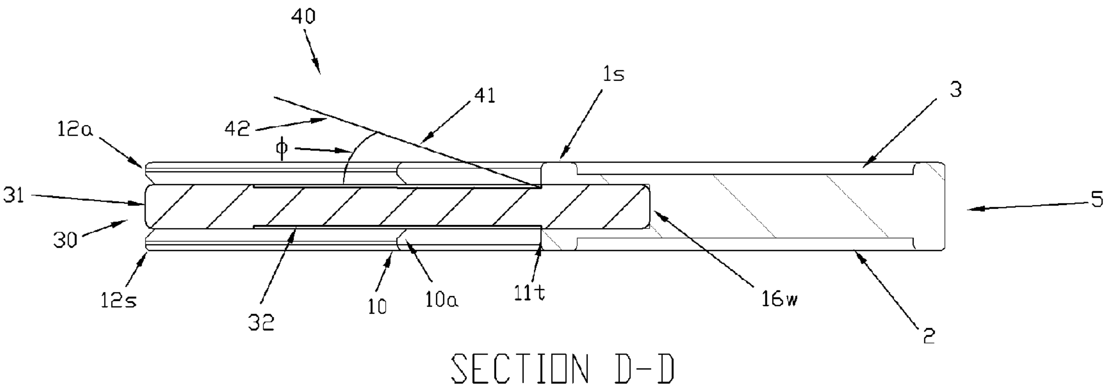

Wall 16*t* along with it's opposing wall and adjacent stop wall 16*s* defines the cavity which stops the progress of the object in chip cavity 17. The distance between opposing walls 16*t* is equivalent to the thickness of the inserted object. The user will place the edge of the label flush against the slope 11*e* which guides the label into the correct location where the remainder of the length of label centering opening 11 provides an orientation for the reminder of the label to be guided into proper placement. It is critical that the label is held at an angle that corresponds closely with the angle ϕ. FIG. 6 details the application of label 40 onto label inset 32. The advantage of this invention is that angle ϕ has been calculated to correlate to a common angle which people will normal place a label prior to application. People use an angle of inclination of the label in order to determine if one edge is flush by eye. This device capitalizes on this angle and orients the rest of the label into perfect alignment with the field of application. The device mirrors itself about the horizontal center of axis, whereby each side of the device is similarly shaped to allow for the placement of labels on each side of the object without having to remove the object from the device. The user is able to rapidly able to simply turn over the device to label the other side of the chip. Prior art device requires the user to deplace and re-insert the chip in order to complete both sides of the object. Further in FIG. 6, label 40 has an adhesive side 42 and a printed side 41. Label 40 is generally found located on a sheet amongst many other labels of similar size. These sheets are capable of receiving inks or toners applied by inkjet or laser printers in mass quantities or with a myriad of varying designs.

It is critical that angle ϕ is greater than 0 but less than 45 degrees so that the label is guided into a position rather than abruptly stopping against a solid surface. In this invention an angle of 30 degree was practiced. Opening edge 10*b* that exists from opening point 10 to termination end 13 is similarly beveled as the edge of opening 11 to facilitate the insertion of the object into the device. The user after preparing the label for application to the object positions the label along the edge slope 11*t* which performs two operations; centering the label over the object along the walls of label centering opening 11 and placing the label at the right angle to facilitate a user to stick the edge of the label in the proper position and being able to remove their finger from the rear of the label while pressing the label into place with their thumb.

Rail 20 raises from the surface of wall 15*w* in a two stage compression/suppression locating action. Opening 15 has a dimension no less than the thickness of the desired object to be inserted. Rail 20 causes there to be a hindrance between the object inserted and rail 20. In this case, the user inserts chip 30 into the rails using lead-in section 20L as a locator for the chip into the device. The initial compressions region 20*c* creates an interference style of fit known as a press fit where there is a degree of interference between the object inserted and the rail 20 along wall 15*w*. In this invention, a poker chip is used with a perimeter edge 31 which travels along rail 20. At a location approximately equivalent to the horizontal location of termination 13, the angle of rail 20 increase to suppression region 20*s* where a small degree of force is required to seat the object against stop wall 16*s*. The object is securely held. The location of the transformation between regions 20*c* and 20*s* is also equivalent to distance between the side and center point of the object as measured from stop wall 16*s*. When the user of this device inserts an object into this device, there is minimal resistance, but there is a noticeable change when the diameter of the object engages in the suppression region 20*s* and a positive placement is felt as the object comes in contact with stop wall 16*s*.

Figure 5A:
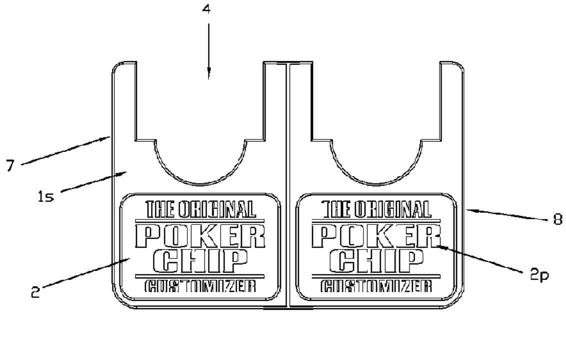
FIG. 5A is a frontal view of the device which is designed to accept two poker chips.
Figure 5:
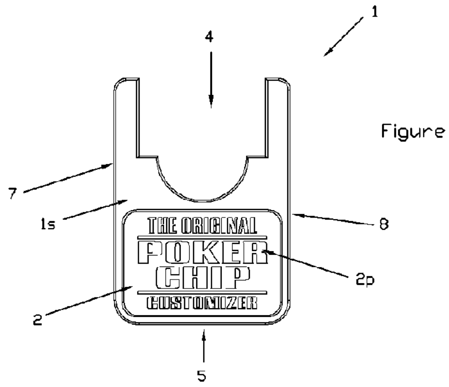
FIG. 5 is an frontal view of the exterior of the device with raised lettering symbolizing the use of a recessed portion of the device.

Device 1 contains recesses regions 2 and 3 which serve two purposes. Firstly, the regions serve as areas where one can either apply product identifiers, such as decals, labels, embossed or pad printed applications. The second purpose is to provide a stress relief area designed to reduce the cross-sectional thickness of the solid piece in relation to the thinner sections surrounding chip cavity 17. FIG. 5 shows the addition of an embossed stamp after application to the recessed region.

This invention has been shown to facilitate the application of small labels onto a poker sized object without having to re-orient the object for a second application of a label on the reverse side of the object. This device and method for using this device is common to many other applications, and the use of a poker chip and label is only present to demonstrate the best mode of practicing this invention but in no means is meant to limit the application of this device to other fields of application.

What is claimed is:

1. A handheld device that facilitates the proper placement of a descriptive marker onto an object where said device is fashioned to accommodate the shape and size of the label application axis of said object and the shape characteristics of the descriptive marker itself comprising a a front side and a rear side separated by an perpendicular edge, said device having a horizontal and a vertical axis, said vertical axis being linearly greater in size than said horizontal axis, and an access port, located along said edge of said device at one end of said device along said vertical axis, said opening configured to accept said object in it's entirety when inserted into the interior of said device, and a marker application apertures, located interiorally from said opening, said aperture shaped to accept approximately one-half of the diameter of said marker, said apertures being configured to enable access to said object from both front and rear side of said device, said apertures having walls with an angle of no more than a 10 degree reverse rake angle, and a retention means, whereby said object is securely held from accidental dislodgement after acceptance into said device.

2. A handheld device that facilitates the proper placement of a descriptive marker onto the center an object where said device is fashioned to accommodate the shape and size of the label application axis of said object and the shape characteristics of the descriptive marker itself as in claim 1 where said device accepts at least one object through at least one access port.

3. A handheld device that facilitates the proper placement of a descriptive marker onto the center an object where said device is fashioned to accommodate the shape and size of the label application axis of said object and the shape characteristics of the descriptive marker itself as in claim 1 said front side and said rear side of said device contains inset relief section located along vertical axis located at the end opposite of said access port.

4. A handheld device that facilitates the proper placement of a descriptive marker onto the center an object where said device is fashioned to accommodate the shape and size of the label application axis of said object and the shape characteristics of the descriptive marker itself as in claim 1 where said retention means consists of opposing angled rails designed to constrictively interface with said edge of said object.

5. A handheld device that facilitates the proper placement of a descriptive marker onto the center an object where said device is fashioned to accommodate the shape and size of the label application axis of said object and the shape characteristics of the descriptive marker itself as in claim 1 where said aperture is located so to be in alignment with area on said object where the marker is to be applied.

6. A handheld device that facilitates the proper placement of a descriptive marker onto the center an object where said device is fashioned to accommodate the shape and size of the label application axis of said object and the shape characteristics of the descriptive marker itself as in claim 1 where said aperture is along the vertical axis of said device.

7. A handheld device that facilitates the proper placement of a descriptive marker onto the center an object where said device is fashioned to accommodate the shape and size of the label application axis of said object and the shape characteristics of the descriptive marker itself as in claim 1 where the object is a token used in to represent money in card games, in particular a poker chip.

8. A handheld device that facilitates the proper placement of a descriptive marker onto the center an object where said device is fashioned to accommodate the shape and size of the label application axis of said object and the shape characteristics of the descriptive marker itself as in claim 1 where the marker is an adhesive backed label adapted for use with personal computer color printers.

* * * * *